(12) United States Patent
Chu et al.

(10) Patent No.: US 10,606,241 B2
(45) Date of Patent: Mar. 31, 2020

(54) PROCESS PLANNING APPARATUS BASED ON AUGMENTED REALITY

(71) Applicants: NATIONAL TSING HUA UNIVERSITY, Hsinchu (TW); NATIONAL TAIPEI UNIVERSITY OF TECHNOLOGY, Taipei (TW); LOCTAI ENTERPRISE CO., LTD., Taoyuan (TW)

(72) Inventors: Chih-Hsing Chu, Hsinchu (TW); Pai Chia Li, Taoyuan (TW); Yu-Wang Liu, Enshi (CN); Liao-Chuan Huang, Taoyuan (TW); Yuan-Ping Luh, Taoyuan (TW)

(73) Assignees: NATIONAL TSING HUA UNIVERSITY, Hsinchu (TW); NATIONAL TAIPEI UNIVERSITY OF TECHNOLOGY, Taipei (TW); LOCTAI ENTERPRISE CO., LTD., Taoyuan (TW)

( * ) Notice: Subject to any disclaimer, the term of this patent is extended or adjusted under 35 U.S.C. 154(b) by 37 days.

(21) Appl. No.: 15/961,027

(22) Filed: Apr. 24, 2018

(65) Prior Publication Data
US 2019/0243335 A1 Aug. 8, 2019

(30) Foreign Application Priority Data
Feb. 2, 2018 (TW) .............................. 107103744 A

(51) Int. Cl.
*G05B 19/40* (2006.01)
*G06T 3/60* (2006.01)
(Continued)

(52) U.S. Cl.
CPC ......... *G05B 19/4097* (2013.01); *G06F 3/048* (2013.01); *G06T 3/60* (2013.01);
(Continued)

(58) Field of Classification Search
None
See application file for complete search history.

(56) References Cited

U.S. PATENT DOCUMENTS 6,239,372 B1 * 5/2001 Gartner ................ B81B 7/0006
174/74 R
7,814,122 B2 * 10/2010 Friedrich ............. G05B 19/409
707/796
(Continued)

FOREIGN PATENT DOCUMENTS

CN 101539804 A 9/2009
WO WO2005045729 A1 5/2005
(Continued)

OTHER PUBLICATIONS

F. Doil, W. Schreiber, T. Alt and C. Patron, "Augmented Reality for manufacturing planning", 2003, The Eurographics Association. (Year: 2003).*
(Continued)

*Primary Examiner* — Mohammad Ali
*Assistant Examiner* — Kelvin Booker
(74) *Attorney, Agent, or Firm* — Muncy, Geissler, Olds & Lowe, P.C.

(57) ABSTRACT

A process planning apparatus based on augmented reality (AR) includes: a camera set capturing color and depth images of a processing machine and a probe operated by a human user in a real scene; a processor, which is signal-connected to the camera set and the processing machine, creates spatial intelligences for motion planning of the probe operated by the human user in an AR environment that combines a virtual workpiece with the real scene, and generates instructional data from the spatial intelligences to guide the human user to operate the probe to produce machine motion data for a manufacturing task; and an output interface, which is signal-connected to the processor and
(Continued)

outputs scene data, the virtual workpiece and the instructional data to the human user.

19 Claims, 3 Drawing Sheets

(51) Int. Cl.
 *G06F 3/048* (2013.01)
 *G05B 19/4097* (2006.01)
 *G06T 19/00* (2011.01)
(52) U.S. Cl.
 CPC .. *G06T 19/006* (2013.01); *G05B 2219/32107* (2013.01); *G05B 2219/36267* (2013.01)

(56) References Cited

U.S. PATENT DOCUMENTS

| | | | | |
|---|---|---|---|---|
| 10,149,958 | B1* | 12/2018 | Tran | A61M 21/00 |
| 10,282,914 | B1* | 5/2019 | Tran | G06T 17/00 |
| 2002/0044104 | A1* | 4/2002 | Friedrich | G05B 19/409 |
| | | | | 345/8 |
| 2005/0021281 | A1* | 1/2005 | Friedrich | G05B 15/02 |
| | | | | 702/150 |
| 2006/0284118 | A1* | 12/2006 | Asmussen | H01J 37/32357 |
| | | | | 250/492.21 |
| 2008/0075358 | A1* | 3/2008 | Yu | G06T 7/80 |
| | | | | 382/154 |
| 2008/0100570 | A1* | 5/2008 | Friedrich | G05B 19/409 |
| | | | | 345/156 |
| 2011/0205341 | A1 | 8/2011 | Wilson et al. | |
| 2012/0163672 | A1* | 6/2012 | McKinnon | G06T 7/593 |
| | | | | 382/106 |
| 2012/0212484 | A1* | 8/2012 | Haddick | G02B 27/0093 |
| | | | | 345/419 |
| 2012/0212499 | A1* | 8/2012 | Haddick | G02B 27/0093 |
| | | | | 345/589 |
| 2012/0218301 | A1* | 8/2012 | Miller | G02B 27/017 |
| | | | | 345/633 |
| 2013/0010068 | A1* | 1/2013 | Tiernan | G06K 9/228 |
| | | | | 348/46 |
| 2013/0278631 | A1* | 10/2013 | Border | G02B 27/017 |
| | | | | 345/633 |
| 2014/0050357 | A1* | 2/2014 | Benhimane | G06T 7/75 |
| | | | | 382/103 |
| 2014/0282257 | A1* | 9/2014 | Nixon | G05B 11/01 |
| | | | | 715/835 |
| 2014/0318699 | A1* | 10/2014 | Longinotti-Buitoni | |
| | | | | A61B 5/0002 |
| | | | | 156/247 |
| 2016/0026253 | A1* | 1/2016 | Bradski | G02B 27/225 |
| | | | | 345/8 |
| 2016/0033251 | A1* | 2/2016 | Pinkston | G01B 21/00 |
| | | | | 702/81 |
| 2016/0132046 | A1* | 5/2016 | Beoughter | G05B 19/4184 |
| | | | | 700/17 |
| 2016/0284079 | A1 | 9/2016 | Persely | |
| 2016/0375524 | A1 | 12/2016 | Hsu | |
| 2016/0381790 | A1* | 12/2016 | Markovsky | G06F 3/012 |
| | | | | 345/633 |
| 2017/0367766 | A1* | 12/2017 | Mahfouz | A61B 34/10 |
| 2018/0232048 | A1* | 8/2018 | Popovich | A61B 3/113 |
| 2018/0336732 | A1* | 11/2018 | Schuster | G06T 19/006 |
| 2018/0339456 | A1* | 11/2018 | Czinger | B33Y 10/00 |
| 2019/0057548 | A1* | 2/2019 | Singh | G06T 19/006 |
| 2019/0102939 | A1* | 4/2019 | He | G06T 19/003 |
| 2019/0147653 | A1* | 5/2019 | Henderson | G06T 19/006 |
| | | | | 345/633 |
| 2019/0172964 | A1* | 6/2019 | Hermes | H01L 31/1864 |

FOREIGN PATENT DOCUMENTS

| | | |
|---|---|---|
| WO | WO2016144741 A1 | 9/2016 |
| WO | WO2018003202 A1 | 1/2018 |
| WO | WO2018005053 A1 | 1/2018 |

OTHER PUBLICATIONS

A. Dünser, K. Steinbügl, H. Kaufmann, and J. Glück, "Virtual and Augmented Reality as Spatial Ability Training Tools", Chinz '06, Jul. 6-7, 2006, Christchurch, New Zealand. (Year: 2006).*

A.Y.C. Nee, and S.K. Ong, "Virtual and Augmented Reality Applications in Manufacturing", Jun. 19-21, 2013, 7th IFAC Conference on Manufacturing Modelling, Management, and Control International Federation of Automatic Control, Saint Petersburg, Russia. (Year: 2013).*

K. Pentenrieder, "Augmented Reality based Factory Planning", Feb. 6, 2008, Institut für Informatik der Technischen Universität München. (Year: 2008).*

Frederik P. Aalund, "A Comparative Study of Screen-Space Ambient Occlusion Methods", Feb. 1, 2013, Thesis, Technical University of Denmark, Informatics and Mathematical Modelling. (Year: 2013).*

Rainer Bischoff and Johannes Kurth, "Concepts, Tools and Devices for Facilitating Human-Robot Interaction with Industrial Robots through Augmented Reality", Oct. 22, 2006, ISMAR Workshop on Industrial Augmented Reality Santa Barbara, CA. (Year: 2006).*

Sanni Siltanen, "Theory and applications of marker-based augmented reality", 2012, VTT Technical Research Centre of Finland. (Year: 2012).*

* cited by examiner

PROCESS PLANNING APPARATUS BASED ON AUGMENTED REALITY

CROSS-REFERENCE TO RELATED APPLICATIONS

This application claims priority of No. 107103744 filed in Taiwan R.O.C. on Feb. 2, 2018 under 35 USC 119, the entire content of which is hereby incorporated by reference.

BACKGROUND OF THE INVENTION

Field of the Invention

This disclosure relates to a process planning apparatus, and more particularly to a process planning apparatus based on augmented reality (AR).

Description of the Related Art

Automatic adhesive dispensers are widely used in the industries involving the manufacturing tasks of integrated circuit packaging, computer and mobile phone cases, car components, optical devices, and the like. A common method of the machine motion planning in those tasks is the so-called programming by demonstration (PbD). A human planner manipulates a machine in an actual manufacturing environment by using a teaching pad or a similar instructive device. The motion that is thereby generated subsequently drives the machine movement while executing its actual job. The user operates the teaching pad through a keyboard and a display screen. This operation interface is not user-friendly or intuitive for the user to move a machine within a complex environment. Collisions are likely to occur between the machine and the work environment. Effective motion planning requires good individual spatial understanding and reasoning.

China Patent No. CN101539804A disclosed a real time human-machine interaction method and a system based on augmented virtual reality and a specialized screen, wherein cameras are used to capture the scene. In this design, however, the projection apparatus is expensive, and the functions of real-time interaction, feedback and rapid path generation are not possible. Thus, the path planning cannot be effectively accomplished with the AR human-machine interface. The system design is of high technical complexity and involves multiple cameras, multiple display devices, AR glasses, force feedback gloves and other devices. Thus, this technology may not be feasible for the small and medium-sized enterprises.

In US 2016/0284079 A1, an expensive photographing device is used to measure three-dimensional coordinates of an actual object, and markers are used to position virtual models in a real scene. However, this technology does not provide an AR interface that assists human operators to complete motion planning of a machine.

BRIEF SUMMARY OF THE INVENTION

It is therefore an objective of this disclosure to provide a novel human-machine interface that facilitates the programming by demonstration task for the path planning of a multi-axis dispenser, wherein the dispenser tip motion is effectively created in the AR environment combining a virtual workpiece with a real scene. The interface generates instructional information in real time that assists a human user to move the dispenser in the work environment without collisions.

To achieve the above-identified objective, this disclosure provides a process planning apparatus based on augmented reality (AR). The process planning apparatus includes: a camera set capturing color and depth images of a processing machine and a probe operated by a human user in a real scene to obtain scene data; a processor, which is signal-connected to the camera set and the processing machine, creates spatial intelligences for path planning of the probe operated by the human user in an AR environment that combines a virtual workpiece with the scene data, and derives instructional data from the spatial intelligences to guide the human user to operate the probe in the AR environment to generate machine motion data; and an output interface, which is signal-connected to the processor, and outputs the scene data of the AR environment, the instructional data, and the motion simulation data to the user.

The real world and the virtual workpiece are precisely combined to construct an AR-based human-machine interface that assists the user to accomplish the programming by demonstration tasks in dispensing adhesives.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

An embodiment of this disclosure provides a process planning apparatus based on augmented reality (AR) that performs motion tracking of a real machine, provides real-time instructional information for improving the user's human spatial reasoning, and thus enables effective path planning. Combining the real scene with virtual workpiece by AR technology provides a highly interactive human-machine interface for accomplishing the programming by demonstration task of 3-axial adhesive dispensers. The interface increases the user's spatial understanding while conducting the task, reduces the path planning errors, and offers a high planning flexibility.

In operation, both color and depth images of the real scene are captured by the camera set and then stored in the process planning apparatus for further processing. Then, the virtual model that works as the workpiece to be planned is displayed on the screen. The user moves a probe or the dispenser tip in the AR scene showing on the screen with reference to instructional information generated instantly. The occlusion relationship between the real scene and the virtual workpiece is properly calculated and displayed with the depth data to increase the user's spatial understanding. Color tracking is applied to estimate three-dimensional coordinates of the dispenser tip or the probe during its movement. Auxiliary functions that assist the user to effectively complete the planning task include the collision warning function, the function of highlighting the projection point on the work plane, the work range detection function, the visual and audio feedback functions and the like. The trajectory of the moving probe or dispenser tip is recorded and converted to the motion commands that directly drive the controllers on the real machine to finish the dispensing task. Thus, before the actual workpiece is produced, the model thereof, which has been already constructed by computer aided design (CAD) systems, can be used as the virtual workpiece. The path planning task of the dispensing operation can be thus accomplished in advance to reduce the manufacturing lead time or to realize the idea of distributed manufacturing.

Figure 1:
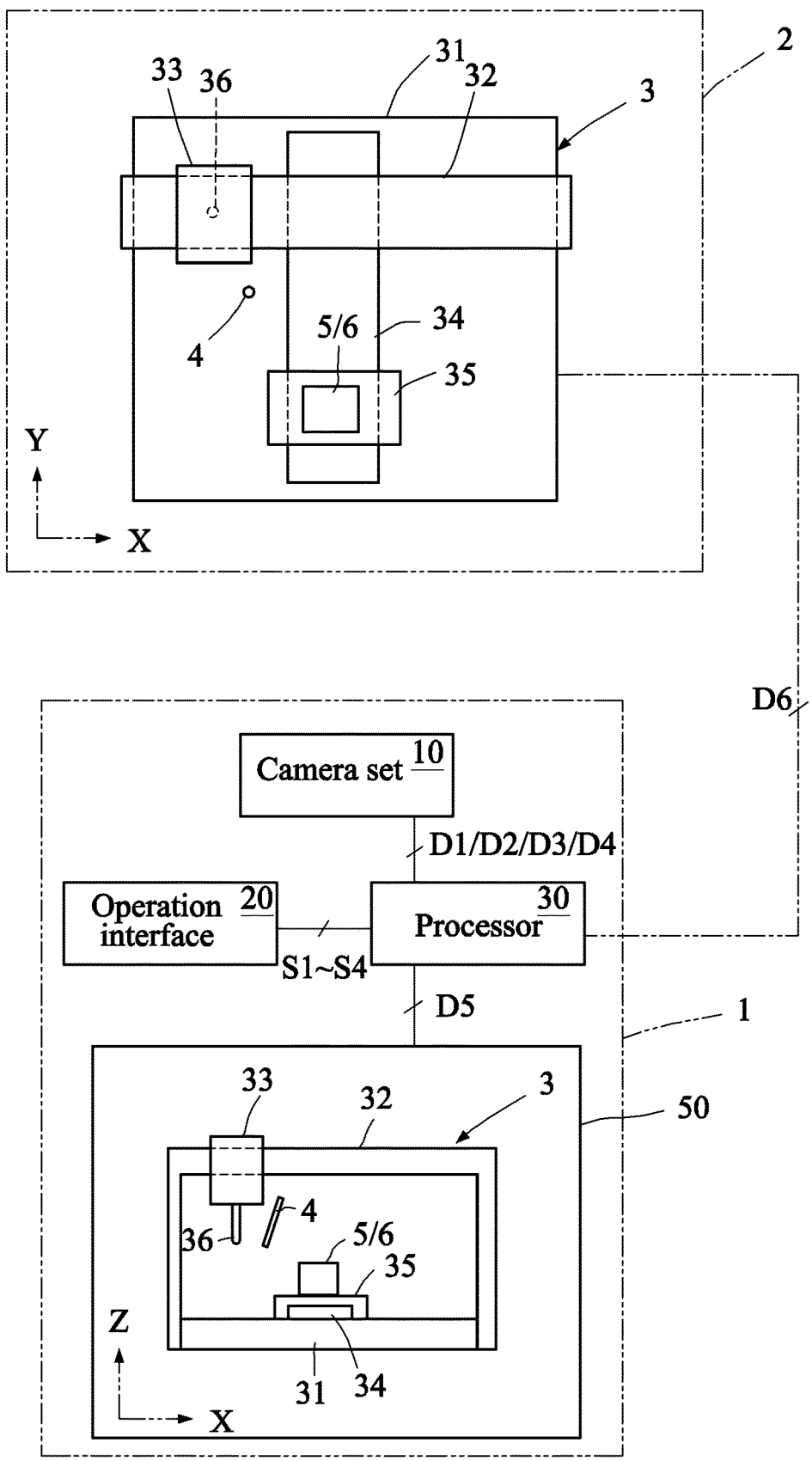
FIG. 1 is a schematic view showing a process planning apparatus according to a preferred embodiment of this disclosure.

FIG. 1 is a schematic view showing a process planning apparatus according to a preferred embodiment of this disclosure. Referring to FIG. 1, a process planning apparatus 1 of this embodiment includes a camera set 10, a processor 30 and an output interface 50.

The camera set 10 captures the color data (or image) D1 and depth data (or image) D2 of a processing machine 3 and a probe 4 or a dispenser tip 36 operated by a human user in a real scene 2 to obtain the scene data (real scene) D3. In this embodiment, the camera set 10 (e.g., the Kinect v2® camera) includes a RGB camera for capturing the color image and a depth camera for capturing the depth image. In addition, the processing machine 3 is an adhesive dispenser for the illustrative purpose only, and this disclosure is not limited thereto. This disclosure is also applicable to other processing machines, such as welding machines, requiring path planning.

The processor 30 is signal-connected to the camera set 10 and the processing machine 3 to obtain scene data D3, creates spatial intelligences D4 for path planning of the probe operated by the human user in the AR environment that combines a virtual workpiece 5 with the scene data D3, and derives instructional data D5 from the intelligences to guide the human user to operate the probe 4 in the AR environment to generate the machine motion data D6. The so-called signal-connection includes, for example but without limitation to, the use of wired or wireless means to achieve data communication. The processor may be a central processing unit (CPU) of a computer, a mobile phone or a cloud server. The signal-connection includes, for example but without limitation to, wired or wireless connection.

The output interface 50 is signal-connected to the processor 30, and outputs the scene data D3, the virtual workpiece 5 and instructional data D5 to the human user for reference. The output interface 50 includes, for example but without limitation to, a display, a speaker, a light indicator and the like.

Upon the actual operation, the color data and the depth data of the real scene data are obtained by the color and depth cameras of Kinect v2®. Then, the processor 30 is used to integrate the color data with the depth data based on the OpenGL® coordinate system serving as the world coordinate system, and to calibrate the Kinect v2® coordinate system (also referred to as the coordinate system of the camera set). In addition, the coordinate calibration method is used to map the real scene data into OpenGL® coordinate system, to convert the two-dimensional image data into the three-dimensional information, and to build the three-dimensional cloud points of the real environment. Then, the three-dimensional cloud points are displayed on the output interface 50, and the frame of the output interface 50 of FIG. 1 is presented. For the sake of simplification, the processing machine 3 of the real scene 2 of FIG. 1 is shown in a top view, and the processing machine 3 in the output interface 50 of FIG. 1 is shown in a front view. In the actual operation, the processing machine 3 in the output interface 50 is presented in a three-dimensional manner.

The processing machine 3 includes: a platform 31; an inverse-U shaped frame 32 mounted on the platform 31; a slider 33 movably mounted on the inverse-U shaped frame 32 and movable in the X-axis; a track 34 mounted on the platform 31; a work table 35 mounted on the track 34 and movable in the Y-axis; and the probe 4 or the dispenser tip 36 disposed on the slider 33 and movable in the Z-axis. In this embodiment, the dispenser tip 36 is a dispensing head for supplying dispensing materials, and the aspect of the dispenser tip 36 is not limited to the structure depicted in the figures. The virtual workpiece 5 is disposed on the work table 35.

After the real scene information has been captured and processed, the three-dimensional coordinates of the virtual workpiece can be precisely combined with the real scene data through a calibration process. Color tracking is used to recognize and position the target instantly. In a multi-axis adhesive dispenser, the target of interest is the probe or the dispenser tip.

First, the human user selects the dispenser tip or the probe in the region of interest through the mouse cursor or keyboard. The system then performs the color tracking in each frame captured by Kinect v2®. It is assumed that the movement of the target between two consecutive frames is limited within the boundary of the selected region. The region of interest is translated by the vector difference between the center of the color tracking result in the previous frame and that of the current frame. The region of interest is thus translated with the same movement vector. In the color tracking, the extracted pixels of the color image are converted from the RGB color space to the YCrCb color space to accelerate the tracking speed for the specific color (or color marker) painted on the probe or the dispenser tip. That is, the processor 30 converts the color data D1 from the RGB color space to the YCrCb color space to accelerate the tracking speed for the specific color painted on the probe 4. In the RGB space, R, G, and B represent red, green, and blue, respectively. In the YCrCb space, Y, Cb, and Cr represent the luminance, blue and red concentration offset components, respectively. No other markers are required.

With the generated machine motion data D6, the processor 30 can directly drive the dispensing tip 36 of the processing machine 3 to accomplish the manufacturing task on a real work part 6. The real work part 6 may also be placed on the work table 35 at the same position of the virtual workpiece 5.

Alternatively, the processor 30 may also simulate the motion of the probe 4 or the dispenser tip 36 of the processing machine 3 to dispense adhesives onto the virtual workpiece 5 based on the machine motion data D6. The human user is able to verify the planning paths by examining the simulation result (simulated dispensing path) showing in the output interface 50 (e.g., a display screen).

The above-mentioned process planning apparatus 1 may further include an operation interface 20 (e.g., mouse, keyboard or touch panel) signal-connected to the processor 30. The human user inputs multiple operation signals S1 to S4 to be transmitted to the processor 30 through the operation interface 20, and the processor 30 generates the machine motion data D6 according to the spatial intelligences D4 and the operation signals S1 to S4.

The above-mentioned operation interface 20 is not an essential component. When the operation interface 20 is not present, the probe 4 can provide an additional function of the operation interface 20. That is, the probe 4 is signal-connected to the processor 30, the human user inputs multiple operation signals S1 to S4 to be transmitted to the processor 30 through the probe 4, and the processor 30 generates the machine motion data D6 according to the spatial intelligences D4 and the operation signals S1 to S4.

Figure 2:
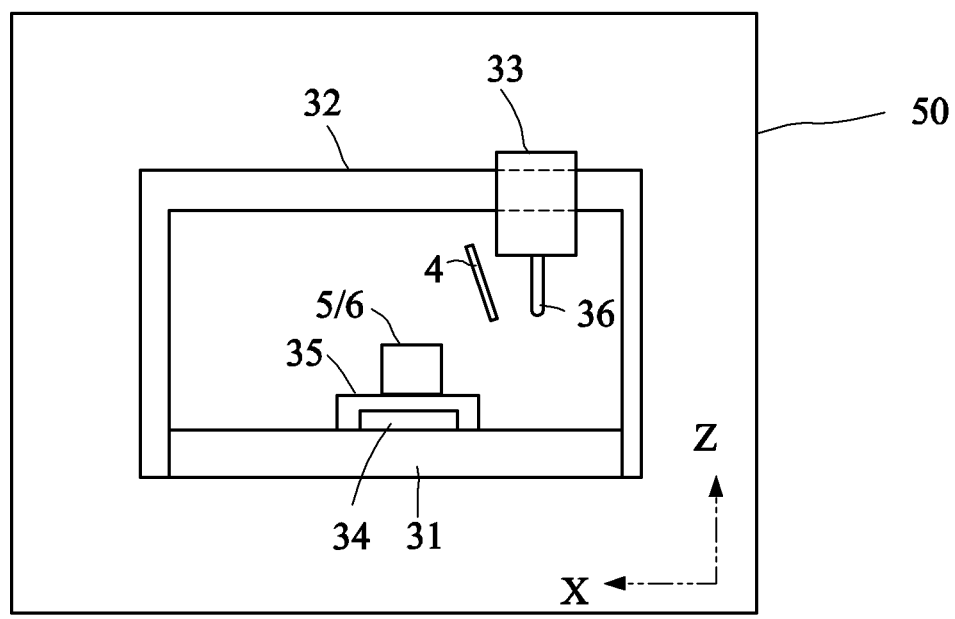
FIG. 2 shows a scene before a mirror image adjustment.

FIG. 2 shows a scene before a mirror image adjustment. In the human-machine interface of FIG. 2, the content displayed on the computer screen is a mirror image of the real world. In this mirror image, it is not intuitive for the human user to operate the dispenser machine in the 3D space. Therefore, this embodiment applies a reversal matrix operation to correct the rendering AR image (the result is shown in FIG. 1), and thus to improve the usability of the human-machine interface. So, the processor 30 performs the mirror image adjustment on the color image and the depth image about a vertical axis to generate the scene data.

The auxiliary planning functions of the human-machine interface provided by the embodiment of this disclosure will be described in the following. In order to increase the human's spatial understanding during the path planning process, the interface offers stimulus of various senses to assist the human user to quickly estimate the spatial relationship between the probe and the work environment, particularly the workpiece. The main purpose is to avoid collisions between them.

The functions provided by this embodiment include collision warning, translucent display, highlighting the projection point on the work plane, detecting the work range, and the visual and audio feedbacks to the human user, when moving the probe close to the work plane. That is, the instructional data D5 includes one or multiple ones of the collision warning data, the translucent display data, the projection point data representative of the projection point on the work plane, the work range data, and the visual and audio feedback data.

Figures 3, 4:
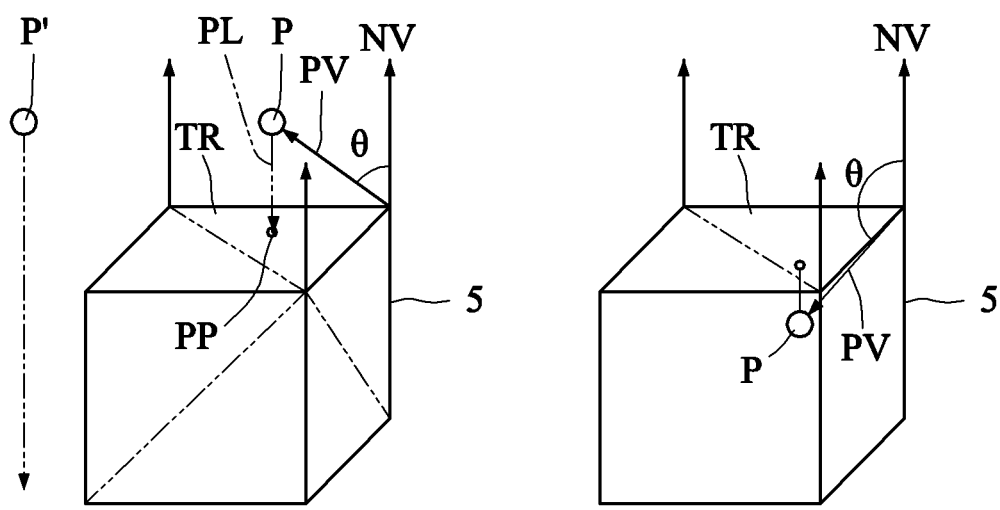
FIGS. 3 and 4 are schematic views showing implementation of a collision warning function.

FIGS. 3 and 4 are schematic views showing implementation of the collision warning function, wherein the processor calculates the normal vector NV for each triangular mesh TR of the virtual workpiece, calculates the connection vector PV of each point in the triangular grid TR to the tip P of the probe, and then calculates the included angle θ between the connection vector PV and the normal vector NV. If θ is smaller than 90°, then the point P and the normal vector NV are on the same side of the virtual workpiece 5. That is, the point P is located outside the virtual workpiece 5. If θ is not smaller than 90°, then the point P is located inside the virtual workpiece 5. As shown in FIG. 3, the point P is currently located outside the virtual workpiece 5, so that the virtual workpiece 5 is shown in the original color. When the point P is located inside the virtual workpiece 5 (as shown in FIG. 4), the virtual workpiece 5 is changed to a different color to warn the human user. Alternatively, the output interface 50 may create a message or sound to warn the human user.

The projection point PP of the point P in FIG. 3 is used to determine whether the point P is located within the range of the virtual workpiece 5. The point P' in the figure does not fall within the work plane (the plane containing the mesh TR) of the virtual workpiece 5. With this information, quantitative data for visual stimulus can be generated. When the projection point PP of the point P falls within the range of the virtual workpiece 5, the projection point PP is highlighted on the work plane, with which the human user can quickly envision the dispensing position; or the distance between the point P and the work plane of the virtual workpiece 5 may be instantly displayed in the interface. Or, a perpendicular line PL from the probe tip (point P) to the work plane is immediately displayed to help the operator to quickly choose the moving direction of the dispensing tip. The display color of the vertical line PL may also be changed according to the distance between the point P and the work plane. For example, the color of the point P becomes darker when it gets closer to the work plane; and the color of the point P becomes lighter when it gets farther away from the work plane. The color of the point P is changed when the point P touches the virtual workpiece. Or, instant audio feedback can be created to bring the human user to attention. For example, the frequency and/or the volume of the warning sound can be varied inversely proportional to the instant distance to the work plane. When the point P is within a certain range with respect to the work plane, the warning sound starts.

In summary, the processor 30 determines whether or not the probe 4 will collide with the virtual workpiece 5 to generate the collision warning data, and calculates a distance between the probe 4 and a work plane on the virtual workpiece 5 to generate the visual and audio feedback data and provide instant visual or audio feedback. On the other hand, the processor 30 projects the dispenser tip 36 or the probe 4 on the virtual workpiece 5 to generate the work range data, and highlights the projection point of the probe 4 on the virtual workpiece 5. The above-mentioned method can be performed by a known calculation equation that projects a three-dimensional point onto a given plane. The projection point PP is to be determined under the assumptions that there is a plane equation of a known triangular mesh TR in the space, that the plane equation is $ax+by+cz+d=0$, and that the coordinates of the point P are $(P_x, P_y, P_z)$. The normal vector NV of the plane of triangular mesh TR is $(a,b,c)$, and a straight line L passing through the point P and perpendicular to the triangular mesh TR can be obtained as:

$$L = \begin{cases} x = P_x + a \times t \\ y = P_y + b \times t \\ z = P_z + c \times t \end{cases}$$

The intersection of the straight line L and the triangular mesh TR is the projection point PP, $$\begin{cases} ax + by + cz + d = 0 \\ x = P_x + a \times t \\ y = P_y + b \times t \\ z = P_z + c \times t \end{cases}$$

The above equations can be simultaneously solved to obtain:

$$t = -\frac{a \times P_x + b \times P_y + c \times P_z + d}{a^2 + b^2 + c^2}$$

The coordinates of Q can be determined by substituting the t value back to the above-mentioned equations.

Figure 5:
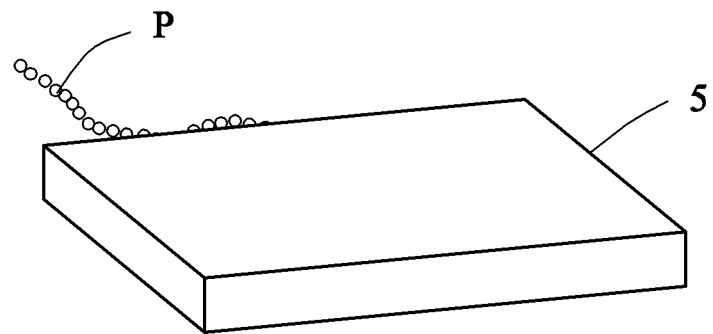
FIGS. 5 and 6 are schematic views showing a translucent display function.
Figure 6:
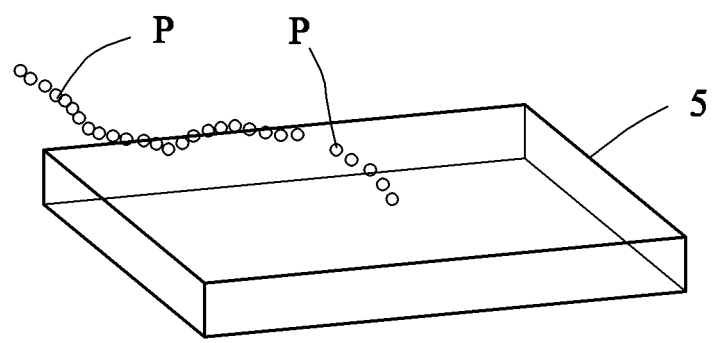

FIGS. 5 and 6 are schematic views showing the translucent display function. As shown in FIGS. 5 and 6, in order to provide the translucent display function, the color channels of the image displayed may be increased to four dimensions. That is, an extra variable controlling the transparency degree is added, and the color mixing degree of the virtual workpiece and the background (real scene) is calculated to produce the visually translucent effect. The calculation is based on the method of linear interpolation: $C=\alpha F +(1-\alpha)B$, where C denotes the mixed result (color mixing degree), $\alpha$ denotes the transparency, F denotes the foreground color of the model (virtual workpiece) to be rendered, and B denotes the color of the existing background (real scene). The translucency effect can increase the visible range of the human user in the work environment while planning the dispenser motion. It enables the human user to see through the virtual object, to perceive the path behind the workpiece, and see the occluded objects in the real world. FIG. 5 depicts the result of the opaque display, wherein several planning points are hidden. FIG. 6 depicts the result of the translucent display, wherein all planning points and the scene behind the virtual workpiece 5 are visible. Therefore, the processor 30 can present the virtual workpiece 5 in a translucent manner, and thus show the actual objects occluded by the virtual workpiece 5 in a real scene.

A post-processing step will be applied to refine the trajectory and the motion data obtained during the planning process. For example, complex paths can be generated by curve fitting, or noise points can be identified and removed by clustering.

Automatic generation of dispensing points is possible for a line trajectory. The human user only needs to specify the end points of the line. For example, a series of sampling points are calculated at a given time interval along a moving trajectory of the probe. This function eliminates the inconsistency of the dispensing locations along a path caused by irregular movement of the human hand.

The above-mentioned embodiment of this disclosure is achieved according to the following steps of: (a) capturing the real scene for motion planning using a depth camera; (b) combining virtual workpiece models with the real scene, wherein the human user operates the dispenser tip; (c) developing the human-machine interfaces that provide real-time auxiliary planning information; (d) refining the motion path of the dispenser according to the dispensing locations determined by the human user; and (e) converting the refined path into the motion commands that directly drive the machine controllers. The embodiment of this disclosure provides an intelligent human-machine interface for motion planning of a multi-axis dispenser that implements the idea of programming by demonstration.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A process planning apparatus based on augmented reality (AR), the process planning apparatus comprising:
a camera set capturing color and depth images of a processing machine and a probe or a dispenser tip operated by a human user in a real scene to obtain scene data;
a processor, which is signal-connected to the camera set and the processing machine, creates spatial intelligences for motion planning of the probe or the dispenser tip operated by the human user in an AR environment combining a virtual workpiece with the scene data, and generates instructional data from the spatial intelligences to guide the human user to operate the probe or the dispenser tip to produce machine motion data; and
an output interface, which is signal-connected to the processor, and outputs the scene data, the virtual workpiece and the instructional data to the human user, wherein:
the processing machine is an adhesive dispenser;
an occlusion relationship between the real scene and the virtual workpiece is calculated by the processor and displayed with depth data of the depth image to increase spatial understanding of the human user;
when the camera set instantly obtains the scene data, the processor instantly creates the spatial intelligences for motion planning in the AR environment presented on the output interface and generates the instructional data presented on the output interface so that the human user can instantly see the scene data, the virtual workpiece and the instructional data on the output interface while operating the probe or the dispenser tip; and
when the human user is guided by the output interface and instantly operates the probe or the dispenser tip, the processor instantly produces the machine motion data according to operations of the human user on the probe or the dispenser tip to determine dispensing locations.

2. The process planning apparatus according to claim 1, wherein the processor further controls the dispenser tip of the processing machine according to the machine motion data to complete a manufacturing task on a real work part.

3. The process planning apparatus according to claim 1, further comprising an operation interface, which is signal-connected to the processor, wherein the human user inputs, through the operation interface, multiple operation signals transmitted to the processor, and the processor generates the machine motion data according to the spatial intelligences and the operation signals.

4. The process planning apparatus according to claim 3, wherein the probe or the dispenser tip is signal-connected to the processor, the human user inputs, through the operation interface, multiple operation signals transmitted to the processor, and the processor generates the machine motion data according to the spatial intelligences and the operation signals.

5. The process planning apparatus according to claim 1, wherein the instructional data comprises one or multiple ones of collision warning data, translucent display data, projection point data, work range data, and visual and audio feedback data.

6. The process planning apparatus according to claim 5, wherein:
the processor determines whether or not the probe or the dispenser tip collides with the virtual workpiece to generate the collision warning data, calculates a distance between the probe or the dispenser tip and a work plane on the virtual workpiece, and generates the visual and audio feedback data according to the distance;
the processor displays the virtual workpiece in a translucent manner to show the scene data occluded by the virtual workpiece; and
the processor determines whether or not projection of the probe or the dispenser tip is within the work plane on the virtual workpiece, generates the work range data, and highlights a projection point of the probe or the dispenser tip on the virtual workpiece.

7. The process planning apparatus according to claim 1, wherein the processor performs a mirror image adjustment on the color image and the depth image about a vertical axis to generate the scene data.

8. The process planning apparatus according to claim 1, wherein the processor converts pixels of the color image from a RGB color space into a YCrCb color space to accelerate a tracking speed of a color marker on the probe or the dispenser tip without any other marker.

9. The process planning apparatus according to claim 1, wherein the adhesive dispenser comprises: a platform; an inverse-U shaped frame mounted on the platform; a slider movably mounted on the inverse-U shaped frame and movable in an X-axis; a track mounted on the platform; a work table mounted on the track and movable in a Y-axis; and the dispenser tip, which is disposed on the slider and movable in a Z-axis and for supplying an adhesive, wherein images of the platform the inverse-U shaped frame, the slider, the track, the work table and the dispenser tip are displayed on the output interface, and an image of the virtual workpiece disposed on the work table is also disposed on the output interface.

10. The process planning apparatus according to claim 9, wherein the processor simulates motion of the probe or the dispenser tip of the processing machine to dispense the adhesive onto the virtual workpiece based on the machine motion data, and to display a simulated dispensing path on the output interface.

11. The process planning apparatus according to claim 1, wherein the process planning apparatus performs motion tracking of the adhesive dispenser, provides real-time instructional information for improving spatial reasoning of the human user, and thus enables effective path planning.

12. The process planning apparatus according to claim 1, wherein the processor refines a motion path of the adhesive dispenser according to the dispensing locations determined by the human user.

13. The process planning apparatus according to claim 1, wherein color tracking is applied to estimate three-dimensional coordinates of the dispenser tip or the probe during movement of the dispenser tip or the probe, and a trajectory of the moving probe or dispenser tip is recorded and converted to motion commands that directly drive a controller on the adhesive dispenser to finish a dispensing task.

14. The process planning apparatus according to claim 1, wherein after information of the real scene has been captured and processed, three-dimensional coordinates of the virtual workpiece are precisely combined with the scene data through a calibration process, and color tracking is used to recognize and position the probe or the dispenser tip instantly.

15. The process planning apparatus according to claim 1, wherein the processor integrates color data of the color image with depth data of the depth image based on a world coordinate system, and calibrates a coordinate system of the camera set, and a coordinate calibration method is used to map the scene data into the world coordinate system, to convert two-dimensional image data into three-dimensional information, and to build three-dimensional cloud points of a real environment displayed on the output interface.

16. The process planning apparatus according to claim 1, wherein the human user selects the dispenser tip or the probe in a region of interest on the output interface through a mouse cursor or keyboard, and color tracking is performed in each of frames captured by the camera set, wherein the region of interest is translated by a vector difference between a center of a color tracking result in a previous frame of the frames and a center of a color tracking result of a current frame of the frames.

17. The process planning apparatus according to claim 1, wherein:
   the instructional data comprises translucent display data for a translucent display function;
   color channels of an image displayed are increased to four dimensions by adding an extra variable controlling a transparency degree; and
   a color mixing degree of the virtual workpiece and the real scene is calculated to produce a visually translucent effect.

18. The process planning apparatus according to claim 17, wherein the color mixing degree is calculated based on a method of linear interpolation:

$$C=\alpha F+(1-\alpha)B,$$

where C denotes the color mixing degree, $\alpha$ denotes a transparency, F denotes a foreground color of the virtual workpiece to be rendered, and B denotes a color of the real scene.

19. The process planning apparatus according to claim 1, wherein a series of sampling points are calculated at a given time interval along a moving trajectory of the probe or the dispenser tip to automatically generate dispensing points and to eliminate inconsistency of the dispensing locations along a path caused by irregular movement of the human user.

* * * * *